US012683172B2

(12) United States Patent
Yu et al.

(10) Patent No.: US 12,683,172 B2
(45) Date of Patent: Jul. 14, 2026

(54) COMPOSITE PARTICLES OF CORE-SHELL STRUCTURE INCLUDING METAL OXIDE PARTICLE CORE AND PLATINUM-GROUP TRANSITION METAL SHELL, AND ELECTROCHEMICAL REACTION ELECTRODE MATERIAL INCLUDING SAME

(71) Applicant: DAEGU GYEONGBUK INSTITUTE OF SCIENCE AND TECHNOLOGY, Daegu (KR)

(72) Inventors: Jong Sung Yu, Seoul (KR); Ha Young Lee, Chungju-si (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 551 days.

(21) Appl. No.: 18/039,434

(22) PCT Filed: Oct. 13, 2021

(86) PCT No.: PCT/KR2021/014113
§ 371 (c)(1),
(2) Date: May 30, 2023

(87) PCT Pub. No.: WO2022/114514
PCT Pub. Date: Jun. 2, 2022

(65) Prior Publication Data
US 2023/0420694 A1     Dec. 28, 2023

(30) Foreign Application Priority Data
Nov. 30, 2020     (KR) ........................ 10-2020-0163936

(51) Int. Cl.
H01M 4/92          (2006.01)
H01M 4/86          (2006.01)

(52) U.S. Cl.
CPC ......... *H01M 4/925* (2013.01); *H01M 4/8657* (2013.01); *H01M 2004/8689* (2013.01)

(58) Field of Classification Search
CPC .......... H01M 4/921; H01M 4/86; H01M 4/92; H01M 4/923; H01M 4/925; H01M 4/8657
See application file for complete search history.

(56) References Cited

FOREIGN PATENT DOCUMENTS

JP          2009-193956 A          8/2009
JP          2017-068667 A          4/2017
(Continued)

OTHER PUBLICATIONS

English Translation of Adzic KR20080007622 obtained via Google Patents on Dec. 8, 2025 (Year: 2025).*
(Continued)

*Primary Examiner* — Sarah A. Slifka
(74) *Attorney, Agent, or Firm* — Sughrue Mion, PLLC

(57)          ABSTRACT

The present invention relates to composite particles of a core-shell structure including a metal oxide particle core and a platinum-group transition metal shell, and an electrode for platinum-group transition metal-based electrochemical reactions including an oxygen reduction reaction, the electrode including the composite particles. Specifically, the present invention relates to: composite particles of a core-shell structure including a platinum-group transition metal shell formed on a metal oxide particle core by a photoreduction reaction; a catalyst for platinum-group transition metal-based electrochemical reactions including an oxygen reduction reaction, the catalyst including the composite particles; an electrode for platinum-group transition metal-based electrochemical reactions including an oxygen reduction reaction; a fuel cell; and a platinum-group transition metal-based electrochemical conversion device.

17 Claims, 7 Drawing Sheets

(56)     References Cited

FOREIGN PATENT DOCUMENTS

| KR | 10-2008-0007622 A | 1/2008 |
| KR | 10-2017-0068667 A | 6/2017 |
| KR | 10-2146291 B1 | 8/2020 |

OTHER PUBLICATIONS

English Translation of KR 102146291 (Year: 2020).*

Y Zhou, et al., "Preparation and characterization of porous Nb2O5 nanoparticles", Materials research bulletin, 2008, pp. 1363-1368, vol. 43, No. 6.

Fuma Ando, et al., "Improvement of ORR Activity and Durability of Pt Electrocatalyst Nanoparticles Anchored on TiO2/Cup-Stacked Carbon Nanotube in Acidic Aqueous Media", Electrochimica Acta, 2017, pp. 404-413, vol. 232.

International Search Report for PCT/KR2021/014113 dated Jan. 21, 2022 (PCT/ISA/210).

* cited by examiner

COMPOSITE PARTICLES OF CORE-SHELL STRUCTURE INCLUDING METAL OXIDE PARTICLE CORE AND PLATINUM-GROUP TRANSITION METAL SHELL, AND ELECTROCHEMICAL REACTION ELECTRODE MATERIAL INCLUDING SAME

CROSS REFERENCE TO RELATED APPLICATIONS

This application is a National Stage of International Application No. PCT/KR2021/014113 filed Oct. 13, 2021, claiming priority based on Korean Patent Application No. 10-2020-0163936 filed Nov. 30, 2020, the entire disclosures of which are incorporated herein by reference.

TECHNICAL FIELD

The present invention relates to composite particles of a core-shell structure including a metal oxide particle core and a platinum-group transition metal shell, and an electrode for platinum-group transition metal-based electrochemical reactions including an oxygen reduction reaction and hydrogen oxidation reaction, the electrode including the composite particles. More specifically, the present invention relates to: composite particles of a core-shell structure including a platinum-group transition metal shell formed on a metal oxide particle core by a photoreduction reaction, a catalyst for platinum-group transition metal-based electrochemical reactions including an oxygen reduction reaction, the catalyst including the composite particles, an electrode for platinum-group transition metal-based electrochemical reactions including an oxygen reduction reaction, a fuel cell, and a platinum-group transition metal-based electrochemical conversion device.

BACKGROUND ART

With the occurrence of various environmental problems, such as global warming, and air and ocean pollution, an interest in clean energy has increased. Among them, hydrogen is the most efficient and clean renewable energy, and water produced by reacting with oxygen is the only reaction product. Hydrogen may be used in internal combustion engines or electrochemical cells to power or generate electricity. Fuel cells that use hydrogen as a fuel are considered the most powerful alternative to fossil fuel-based engines because they have high energy efficiency and are free from pollutant emissions.

The biggest limitation of low-temperature fuel cells is that an oxygen reduction reaction (ORR) at a cathode is kinetically unfavorable, which causes the need to use an excessive amount of catalysts.

Currently, platinum and its alloys are known as the best substances as ORR catalysts. However, despite considerable research on these platinum-based fuel cells, their mass commercialization is very limited, mainly due to slow electron-transfer kinetics at the cathode, and the high cost, low durability and lack of abundance of platinum-based precious metals.

Carbon has been commercially utilized as a support for ORR catalysts due to its material characteristics of high electrical conductivity, high specific surface area, and excellent durability. However, deterioration (oxidation) occurs during long-term operation, and catalytic activity decreased due to aggregation or detachment of a platinum catalyst, thereby deteriorating the activity and durability of the fuel cells. In order to solve these problems, metal oxides or metal carbides have been studied as supports, but due to low electrical conductivity and low specific surface area, they have limitations that cannot replace carbon supports.

Accordingly, there is a need to develop an ORR catalyst capable of having constant catalytic activity and excellent durability without deterioration during long-term operation and a fuel cell including the ORR catalyst.

RELATED ART DOCUMENT

Non-Patent Document (Non-Patent Document 1) "Improvement of ORR Activity and Durability of Pt Electrocatalyst Nanoparticles Anchored on TiO2/Cup-Stacked Carbon Nanotube in Acidic Aqueous Media", Electrochimica Acta 2017, 232, pp. 404-413

DISCLOSURE

Technical Problem

An object of the present invention is to provide a catalyst for platinum-group transition metal-based electrochemical reactions including an ORR capable of having constant catalytic activity and excellent durability without deterioration during long-term operation, a fuel cell including the catalyst, and a platinum-group transition metal-based electrochemical conversion device. Specifically, the present invention is to provide composite particles of a core-shell structure capable of fundamentally removing aggregation or detachment of a platinum catalyst caused by deterioration of a carbon support, an ORR catalyst and a fuel cell including the composite particles, and a platinum-group transition metal-based electrochemical reaction and its conversion device, by replacing a carbon support that deteriorates (oxidizes) during long-term operation and substantially not including the carbon support as a reduction electrode.

Another object of the present invention is to provide a method for producing composite particles of a core-shell structure in which a platinum-group transition metal is uniformly formed on a metal oxide core so that the platinum-group transition metal is substantially distributed only on the metal oxide core to exhibit excellent ORR characteristics.

Technical Solution

In one general aspect, composite particles of a core-shell structure include: a core containing a core-shell metal oxide; and a shell containing a platinum-group transition metal coating the metal oxide.

The metal oxide may be niobium oxide.

The platinum-group transition metal may be platinum (Pt).

Primary particles of the metal oxide may have a diameter of 3 to 1,000 nm.

The metal oxide may have a maximum absorption wavelength at 250 to 550 nm.

The platinum-group transition metal of the shell may be prepared from a photoreduction reaction of a platinum-group transition metal precursor.

The shell may have a thickness of 3 to 50 nm.

The metal oxide may be a catalyst support for platinum-group transition metal-based electrochemical reactions including an oxygen reduction reaction.

In another general aspect, a catalyst for platinum-group transition metal-based electrochemical reactions includes: an oxygen reduction reaction including composite particles of a core-shell structure.

The catalyst for platinum-group transition metal-based electrochemical reactions including an oxygen reduction reaction includes a plurality of composite particles of a core-shell structure, wherein the plurality of composite particles may aggregate with each other to form an aggregate and to make an electrically-conductive contact to each other.

The catalyst for platinum-group transition metal-based electrochemical reactions including the oxygen reduction reaction may not substantially include carbon.

In another general aspect, an electrode includes composite particles of a core-shell structure.

In another general aspect, a platinum-group transition metal-based electrochemical conversion device includes composite particles of a core-shell structure.

In another general aspect, a fuel cell includes: an anode; an electrolyte membrane; and a cathode including the composite particles of a core-shell structure applied to one side of the electrolyte membrane.

The cathode may not substantially include carbon.

In another general aspect, a method for preparing the composite particles of a core-shell structure includes: (a) preparing a dispersion by dispersing metal oxide particles in an alcohol solution; (b) preparing a mixed solution by mixing an aqueous solution of a platinum-group transition metal precursor with the dispersion; and (c) preparing composite particles of a core-shell structure by irradiating the mixed solution with light.

The platinum-group transition metal precursor may be a water-soluble platinum-group transition metal precursor.

The metal oxide particles may have a band gap of 2.0 eV or more.

The metal oxide particles in step (a) may be prepared from: preparing a metal oxide solution dissolved in hydro-fluoric acid; preparing a diluted solution by mixing the metal oxide solution with water; preparing a precipitate by mixing the diluted solution with a reducing agent to adjust a pH to basic; and performing heat treatment on the precipitate.

Advantageous Effects

The composite particles of a core-shell structure according to the present invention may fundamentally eliminate the agglomeration or desorption of a platinum catalyst caused by the deterioration of a carbon support by substantially not including the carbon support as a cathode, which may dramatically improve the activity and durability of fuel cell when used as an electrode for platinum-group transition metal-based electrochemical reactions including an oxygen reduction reaction.

In addition, a method for manufacturing composite particle of a core-shell structure according to the present invention exhibits excellent ORR characteristics by uniformly forming a platinum-group transition metal on a metal oxide core and substantially distributing the platinum-group transition metal only on the metal oxide core compared to a chemical reduction method, and thus has superior commercial viability compared to commercially available ORR catalysts.

BEST MODE

Figure 1:
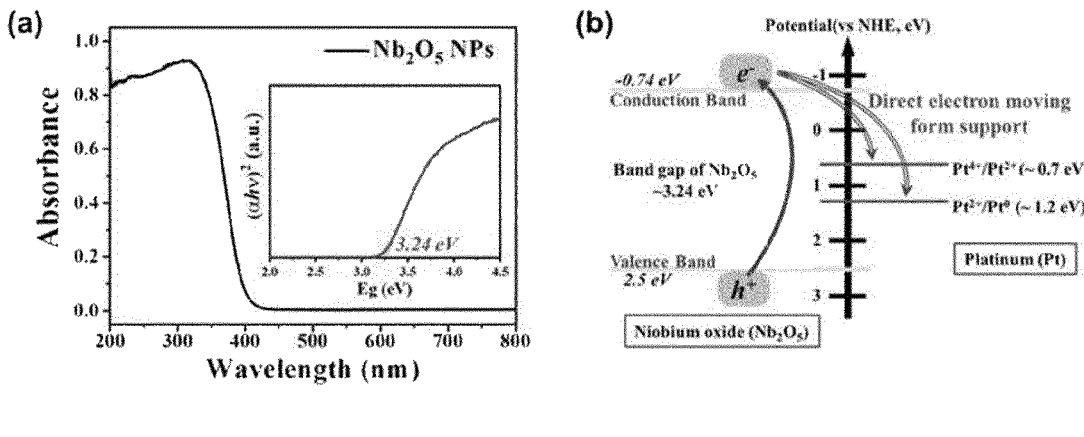
FIG. 1 illustrates an ultraviolet-visible light (UV-Vis) diffuse reflectance spectrum of niobium oxide particles, a band structure, and a schematic diagram of formation of a platinum shell by photodeposition of platinum ions on niobium oxide particles, respectively.
Figure 1:
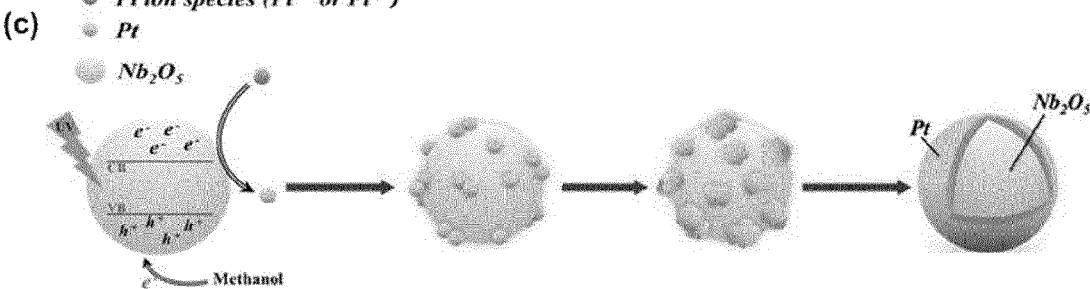

Hereinafter, composite particles of a core-shell structure of the present invention and an electrode for platinum-group transition metal-based electrochemical reaction including an oxygen reduction reaction, the electrode including the composite particles, will be described in detail with reference to the accompanying drawings. The drawings to be provided below are provided by way of example so that the spirit of the present invention can be sufficiently transferred to those skilled in the art. Therefore, the present invention is not limited to the accompanying drawings provided below, but may be modified in many different forms. In addition, the accompanying drawings suggested below will be exaggerated in order to clear the spirit and scope of the present invention. Technical terms and scientific terms used in the present specification have the general meaning understood by those skilled in the art to which the present invention pertains unless otherwise defined, and a description for the known function and configuration unnecessarily obscuring the gist of the present invention will be omitted in the following description and the accompanying drawings.

The present inventors noted that despite the fact that Pt/C used in a cathode of commercially available fuel cells has relatively excellent oxygen reduction activity, deterioration (oxidation) to carbon monoxide or carbon dioxide occurs through reaction with water during long-term operation, and a decrease in catalytic activity occurs due to aggregation or detachment of a platinum catalyst caused by deterioration of a carbon support, and thus, the activity and durability of the fuel cell deteriorated. As a result of concentrated research to solve the above problems, the present inventors completed the present invention by finding that composite particles for oxygen reduction reactions of a core-shell structure prepared by forming a shell containing a platinum-group transition metal by a photoreduction reaction on a core containing a metal oxide exhibited ORR activity equal to or superior to commercially available Pt/C catalysts and maintained the activity and durability of the fuel cell for a long period of time.

Hereinafter, composite particles of a core-shell structure according to the present invention will be described in detail.

The composite particles of a core-shell structure according to the present invention include: a core containing a core-shell metal oxide; and a shell containing a platinum-group transition metal coating the metal oxide.

According to one aspect, the metal oxide may have low electrical conductivity or may be an insulator. Specifically, the metal oxide particles may absorb light in a range of 200 to 400 nm, and may have a band gap of 2.0 eV or more, specifically 3.0 eV or more, more specifically, 3.2 eV or more, and without limitation, 4.0 eV or less, as calculated from a Tauc plot in which $(\alpha h v)^2$ vs hv is plotted. The metal oxide particles may have a conduction band of 0.7 eV or more and a valence band of 1.2 eV or less.

As the metal oxide has a band gap as described above, the standard reduction potentials of $Pt^{4+}/Pt^{2+}$ and $Pt^{2+}/Pt^0$ may be located between the band structures of metal oxides, and as will be described later, the metal oxide absorbs light in an ultraviolet range, and excited electrons in the conduction band move to a surface of the metal oxide to reduce a platinum-group metal ion to a platinum-group metal.

According to one aspect, the metal oxide may be niobium oxide, specifically $Nb_2O_5$. Niobium oxide may have a bandgap of 3.0 eV or more, may effectively reduce platinum-group metal ions by absorbing ultraviolet light, and may stably generate platinum-group metal nanoparticles on a surface of niobium oxide. Particularly, platinum ions reduced on the surface of niobium oxide may be preferably generated in a form of nanoparticles around previously generated platinum-group metal nanoparticles. According to a continuous reduction reaction of these platinum ions, the small platinum-group metal nanoparticles may be gradually agglomerated with adjacent platinum-group metal nanoparticles to form a uniform thin platinum-group metal-containing shell, thereby completely conformally coating the surface of niobium oxide.

Referring to (c) of FIG. 1, when niobium oxide particles are irradiated with light, platinum ions present in the solution are reduced by absorbing ultraviolet light. The reduced platinum ions are deposited in the form of nanoparticles on the surface of the niobium oxide particles, and a uniform and thin platinum shell is formed by a continuous reduction reaction of the platinum ions, and a platinum shell is formed on the core of the niobium oxide particles to produce composite particles of a core-shell structure.

According to one aspect, primary particles of the metal oxide may have a diameter of 3 to 1,000 nm, specifically 10 to 500 nm, and more specifically 20 to 200 nm, but the present invention is not limited thereto. The primary particles may mean particles having a spherical shape, a polygonal shape, a shape elongated in one direction, or an irregular shape.

According to one aspect, the metal oxide may have a maximum absorption wavelength at 200 to 550 nm, specifically 250 to 550 nm, and more specifically 250 to 350 nm. (a) of FIG. 1 illustrates an absorption spectrum of niobium oxide particles, and it can be seen that they have a maximum absorption wavelength in the range of 300 to 350 nm and a band gap of 3.24 eV.

According to one aspect, the metal oxide may serve as a catalyst support for an oxygen reduction reaction. That is, a core containing the metal oxide does not participate in the oxygen reduction reaction, but may act as a support so that a shell containing a platinum-group transition metal formed on the core containing the metal oxide stably operates as a catalyst for the oxygen reduction reaction, as described above, may absorb light to reduce platinum-group metal ions on the surface of the metal oxide to induce stable formation of a conformal coating layer.

According to one aspect, the platinum-group transition metal may be an element belonging to group 8, 9, 10 or 11 of the periodic table, specifically ruthenium (Ru), rhodium (Rh), palladium (Pd), osmium (Os), iridium (Ir), silver (Ag), gold (Au), or platinum (Pt), and more specifically, platinum (Pt).

However, it should not be construed as being limited to the inclusion of the platinum-group transition metal alone in the shell formed on the surface of the metal oxide. According to one aspect, the platinum-group transition metal included in the shell formed on the surface of the metal oxide may be included alone or in the form of an alloy with another platinum-group transition metal or an intermetallic compound. In order to include the alloy or intermetallic compound in the shell, a mixture of different platinum-group transition metal precursors may be included in a solution, and the precursor mixture may be simultaneously reduced in a suitable light irradiation environment and a solution environment. According to another aspect, a transition metal other than the platinum-group transition metal may be included in the shell in the form of an alloy or an intermetallic compound. Accordingly, the amount of the platinum-group metal used may be reduced and the catalytic activity equivalent to that of the platinum group metal may be exhibited, which is preferable.

According to one aspect, the platinum-group transition metal of the shell is preferably prepared from the photoreduction reaction of the platinum-group transition metal precursor, and platinum ions reduced by the photoreduction reaction may form a uniform and thin shell containing the platinum-group metal on the surface of the platinum-group metal nanoparticles. The platinum-group transition metal formed from the photoreduction reaction forms a uniform and thin high-density shell on a metal oxide core compared to the platinum group-transition metal produced by chemical reduction reaction, and preferably the platinum-group transition metal is substantially distributed only on the metal oxide core.

As the platinum-group transition metal forms a conformally coated shell on the metal oxide core, the platinum-group transition metal may have electrical conductivity equal to or superior to commercially available carbons. The significant electrical conductivity is caused by the formation of a shell conformally coated with a platinum-group transition metal on the metal oxide core, which substantially does not contribute to the electrical conductivity. On the other hand, the platinum-group transition metal shell produced by the chemical reduction reaction may have very low electrical conductivity, which is caused by the fact that the platinum-group transition metal does not form a uniform shell and the metal oxide core with low electrical conductivity is exposed on the surface. For the reason described above, in the composite particle of a core-shell, the shell conformally coated with the platinum-group transition metal may exhibit very high electrical conductivity by electrically contacting adjacent composite particles of a core-shell structure or electrically contacting each other by aggregating with each other to form aggregates.

The aggregate formed by a plurality of composite particles of a core-shell structure may be an aggregate formed by irregular aggregation, and may include an aggregate between composite particles of a core-shell structure, which is primary particles, and an irregular aggregate between primary particles and secondary particles (aggregated particles of composite particles of a core-shell structure) and/or between secondary particles. Through this aggregation, a pathway for electron transfer may be formed to exhibit very high electrical conductivity.

The reason why high electrical conductivity as described above may be realized even when the composite particles of a core-shell structure have a thin shell is that the platinum-group transition metal is coated on the surface of the oxide by the photoreduction reaction from the precursor compound. The high electrical conductivity of the composite particles of a core-shell structure allows the composite particles to exhibit ORR activity comparable to that of Pt/C used in the cathode of commercially available fuel cells even though they do not substantially contain a carbon support when used in the cathode.

In the specification, the carbon is not substantially included means that carbon is not included as a conductive material as a main support and is not interpreted as meaning excluding trace amounts of carbon included in the electrode. Here, a trace amount of carbon that may be included in the electrode may be specifically interpreted as 5% by weight or less, more specifically 1% by weight or less, or 0.1% by weight or less.

According to one aspect, the shell containing the platinum-group transition metal surrounding the metal oxide may have a thickness of 3 to 50 nm, and more preferably 10 to 20 nm. As described above, as the platinum-group transition metal forms a uniform and thin high-density shell, the composite particles of a core-shell structure may not substantially expose the surface of the metal oxide core only with the thickness of the thin shell, and may have excellent electrochemical catalytic activity and stability.

A ratio (D/T) of a diameter (D) of a core containing a metal oxide to a thickness (T) of a shell containing the platinum-group transition metal surrounding the metal oxide may be 2 to 100, specifically 5 to 50, and more specifically 10 to 20.

In addition, the present invention provides a catalyst for platinum-group transition metal-based electrochemical reactions including an oxygen reduction reaction, wherein the catalyst includes the composite particles of a core-shell structure as described above.

The catalyst for platinum-group transition metal-based electrochemical reactions including an oxygen reduction reaction according to the present invention may include a plurality of composite particles of a core-shell structure, and one composite particle of a core-shell structure may be in electrical contact with another adjacent composite particles of a core-shell structure, or may be electrically contacted with each other by aggregating with each other to form an agglomerate. As a plurality of composite particles of a core-shell structure electrically contact each other, a catalyst for platinum-group transition metal-based electrochemical reactions including an oxygen reduction reaction, composed of a plurality of composite particles of a core-shell structure may exhibit very high electrical conductivity, and may exhibit very high oxygen reduction catalytic activity even without containing carbon commonly used in an oxygen reduction reaction.

According to one aspect, the aggregate formed by a plurality of composite particles of a core-shell structure may be an aggregate formed by irregular aggregation, and may include an aggregate between composite particles of a core-shell structure, which is primary particles, and an irregular aggregate between primary particles and secondary particles (aggregated particles of composite particles of a core-shell structure) and/or between secondary particles. Through this aggregation, a pathway for electron transfer may be formed to exhibit very high electrical conductivity.

In addition, the present invention provides an electrode, wherein the electrode includes composite particles of a core-shell structure as described above.

The composite particles of a core-shell structure may be included in the form of a coating layer coated on an electrode, and in this case, may be used together with a known polymer binder to form the coating layer.

As the polymer binder, any ion conductive binder may be used without limitation, and specifically, a Nafion binder or a derivative thereof may be exemplified, but the present invention is not limited thereto. As the electrode, any material having conductivity may be used without limitation, and specifically, a metal electrode or a carbon-based electrode may be exemplified, but the present invention is not limited thereto.

In addition, the present invention provides an electrochemical conversion device, wherein the electrochemical conversion device includes composite particles of a core-shell structure as described above. Here, the composite particles of a core-shell structure may be included in the electrode, and known components may be used for the components included in the electrochemical conversion device other than the electrode.

In addition, the present invention may provide membrane electrode assemblies (MEAs) including the composite particles of a core-shell structure as described above.

The present invention provides a fuel cell, wherein the fuel cell includes: an anode; an electrolyte membrane; and a cathode including the composite particles having a core-shell structure as described above applied to one side of the electrolyte membrane. Here, the fuel cell may be an alkaline fuel cell (AFC), a polymer electrolyte membrane fuel cell (PEMFC), or a direct methanol fuel cell (DMFC), but the present invention is not limited thereto.

As the electrolyte membrane, an electrolyte membrane having hydrogen ion conductivity used in this technical field may be used without limitation. Specifically, the electrolyte membrane may be a polymer electrolyte membrane having excellent hydrogen ion conductivity, mechanical properties, and chemical resistance. For example, a polymer selected from the group consisting of perfluorosulfonic acid polymer, hydrocarbon-based cation exchange polymer, polyimide, polyvinylidene fluoride, polyethersulfone, polyphenylene sulfide, polyphenylene oxides, polyphosphazene, polyethylene naphthalate, doped polybenzimidazole, polyether ketone, polysulfone, and acids and bases thereof may be used, preferably a perfluorosulfonic acid polymer (trade name: Nafion) may be exemplified, but the present invention is not limited thereto.

The composite particle of a core-shell structure may be applied to one side of an electrolyte membrane to form a cathode. In detail, the composite particles of core-shell structure are mixed with a polymer electrolyte solution to be prepared in the form of a slurry, and the slurry is applied to one side of an electrolyte membrane and then dried to form a cathode.

The polymer electrolyte (ionomer) included in the polymer electrolyte solution is not limited as long as it is a polymer having hydrogen ion conductivity, and may be, for example, the same type of polymer as the polymer included in the electrolyte membrane. The polymer electrolyte may be dissolved in an amount of 0.1 to 25% by weight, and specifically 1 to 10% by weight, but the present invention is not limited thereto. In addition, the solvent included in the polymer electrolyte solution may be a $C_1$-$C_6$ alcohol-based solvent, and specifically, a co-solvent of a $C_1$-$C_6$ alcohol-based solvent and water.

It should be noted that the fuel cell according to the present invention may exhibit ORR activity similar to or improved from commercially available fuel cells due to an excellent electrical conductivity without substantially containing carbon, and may significantly extend their lifespan due to significantly improved catalytic activity durability.

The present invention provides a method for preparing composite particles of a core-shell structure, the method comprising: (a) preparing a dispersion by dispersing metal oxide particles in an alcohol solution; (b) preparing a mixed solution by mixing an aqueous solution of a platinum-group transition metal precursor with the dispersion; and (c) preparing composite particles of a core-shell structure by irradiating the mixed solution with light.

Step (a) is a step of preparing a dispersion in which core particles are dispersed, where a dispersion in which metal oxide particles are dispersed in an alcohol solution is prepared. The alcohol may be a $C_1$-$C_4$ alcohol, and preferably a co-solvent mixed with water. A volume ratio of water to alcohol may be 1:9 to 9:1. The metal oxide particles may be included in an amount of 0.001 to 10% by weight, and preferably 0.01 to 1% by weight, based on the total weight of the dispersion.

As the metal oxide particles of step (a), the obtained metal oxide particles may be used as they are, but step (a) may further include uniformly adjusting a size of the metal oxide particles and recrystallizing the metal oxide particles to increase a surface area.

Specifically, recrystallized metal oxide particles of nanoscale order may be prepared by including: preparing a metal oxide solution dissolved in hydrofluoric acid; preparing a diluted solution by mixing the metal oxide solution with water; preparing a precipitate by mixing the diluted solution with a reducing agent to adjust the pH to basic; and performing heat treatment on the precipitate.

In metal oxide solutions, commercially available metal oxides may be dissolved in hydrofluoric acid at a concentration of 0.5 to 20 g/L, and specifically 1 to 10 g/L, and may be dissolved under conditions warmed to a temperature of 70 to 150° C. in order to efficiently prepare a solution. The prepared metal oxide solution is mixed with water to prepare a diluted solution at a concentration of 1 to 10 g/L, and then mixed with a reducing agent to adjust a pH to basic to obtain a precipitate.

The reducing agent may be a basic organic reducing agent, and may be ammonia, for example, as a nitrogen-containing organic compound. Here, a pH adjusted to basicity may be 8 to 12, and specifically 8.5 to 10. The metal oxide present in the solution is precipitated by the addition of the basic reducing agent, and the precipitate is dried and heat-treated to produce nano-sized recrystallized metal oxide particles.

A heat treatment temperature may be 400 to 800° C., and a heat treatment time may be 10 minutes to 3 hours, but these are exemplary conditions and are not limited thereto.

Step (b) is a step of preparing a mixed solution by mixing an aqueous solution of a platinum-group transition metal precursor with the dispersion of metal oxide prepared in step (a), where the platinum-group transition metal precursor is not limited as long as it is a water-soluble platinum-group transition metal precursor. Specifically, the platinum-group transition metal precursor may be any one or a combination of two or more selected from the group consisting of $H_2PtCl_6$, $H_6Cl_2N_2Pt$, $PtCl_2$, $PtBr_2$, $Pt(acac)_2$ (Platinum acetylacetonate), $K_2$ ($PtCl_4$), $H_2Pt(OH)_6$, $Pt(NO_3)_2$, [Pt$(NH_3)_4]Cl_2$, $[Pt(NH_3)_4](HCO_3)_2$, $[Pt(NH_3)_4](OAc)_2$, $(NH_4)_2$ $PtBr_6$, $(NH_3)_2PtCl_6$, and hydrates thereof, but this is only an example and the present invention is not limited thereto.

The platinum-group transition metal precursor may be provided in the form of an aqueous solution, and may be provided at a concentration of 1 to 60% by weight, specifically 5 to 50% by weight in the aqueous solution. When an aqueous solution of a platinum-group transition metal precursor is added to the dispersion of metal oxide prepared in step (a), the platinum group transition metal precursor may be added in an amount of 1 to 200 parts by weight, and specifically 10 to 100 parts by weight, based on 100 parts by weight of the metal oxide particles.

After the step (b) is completed, purging with an inert gas may be further included.

Step (c) is a step of irradiating light to the solution prepared in step (b) to prepare composite particles of a core-shell structure, where the platinum-group transition metal precursor is reduced through light irradiation to form a shell of the platinum-group transition metal on the surface of the metal oxide particle.

The light is not limited as long as it is a light source capable of irradiating light in an ultraviolet-visible (UV-Vis) range, and a short-wavelength laser having a wavelength corresponding to the band gap of the metal oxide particles or a gas discharge light source having a wavelength range of 250 to 700 nm may be used without limitation, and may be, for example, a mercury lamp or a xenon lamp. The light source may have a power of 10 to 2,000 W, but the light source having a power of 100 to 1,000 W may be used to efficiently reduce the platinum-group transition metal, but the present invention is not limited thereto.

After the platinum-group transition metal is reduced through light irradiation to prepare composite particle of a core-shell structure, filtration and washing may be further included, and drying at a high temperature may be further included. Since a purification process is well known in the art, a detailed description thereof will be omitted.

(Preparation Example) Synthesis of Niobium Oxide ($Nb_2O_5$) Nanoparticles 0.3 g of commercially available bulk $Nb_2O_5$($C$-$Nb_2O_5$) powder (Sigma Aldrich) was dissolved in HF solution in an oven at 100° C. The solution was diluted with water until the concentration of $Nb_2O_5$ was 4 g/L. Then, a pH of the solution was adjusted to 9 by adding an ammonia solution, and niobic acid hydrate ($Nb_2O_5*nH_2O$) was obtained as a white precipitate. The niobic acid hydrate was filtered and washed out with water, and heat-treated in air at 600° C. for 30 minutes to prepare a white niobium oxide powder.

(Example 1) Synthesis of Composite Particles Composed of Niobium Oxide ($Nb_2O_5$) Core and Platinum (Pt) Shell Through Light Irradiation As illustrated in (c) of FIG. 1, a shell containing platinum (Pt) was formed through light irradiation on the surface of a niobium oxide ($Nb_2O_5$) core in the following manner.

0.1 g of niobium oxide nanoparticles obtained in Preparation Example were dispersed in a cylindrical quartz reactor containing 100 ml of 50 vol % methanol-water co-solvent, and a desired amount (40, 30, 20, 10 wt %) of an aqueous $H_2PtCl_6$ solution was added thereto to prepare a mixed solution. The mixed solution was purged with high-purity nitrogen gas, irradiated with light using a UV-Vis lamp (450 W, Xe lamp) equipped with a liquid infrared (IR) filter for light-induced reduction of Pt, and stirred for 3 hours. Niobium oxide ($Nb_2O_5$) coated with platinum (Pt) was filtered, washed several times with distilled water, and then dried at 60° C. overnight to finally obtain composite particles. The composite particles of a core-shell structure composed of a niobium oxide ($Nb_2O_5$) core and a platinum (Pt) shell prepared by light irradiation were named Pt-X/NbO-PD, where X represents a Pt loading amount.

(Comparative Example 1) Synthesis of Composite Particles Composed of Niobium Oxide ($Nb_2O_5$) Core and Platinum (Pt) Shell Through Chemical Reduction A dispersion was prepared by dispersing 0.1 g of $Nb_2O_5$ nanoparticles in a reactor containing a 250 ml solution of water and applying ultrasonic waves for 20 minutes. A mixed solution was prepared by adding a 40 wt % aqueous solution of $H_2PtCl_6$ to the dispersion, and the pH of the solution was adjusted to 10 by adding an ammonia solution. Then, an aqueous solution of sodium borohydride ($NaBH_4$) as a reducing agent was added dropwise so that a molar ratio of platinum:sodium borohydride was 1:10, and the mixture was reacted overnight while stirring. Niobium oxide ($Nb_2O_5$) coated with platinum (Pt) was filtered, washed several times with distilled water, and then dried at 60° C. overnight to finally obtain composite particles. The composite particles of a core-shell structure composed of a niobium oxide ($Nb_2O_5$) core and a platinum (Pt) shell prepared by a chemical reduction method were named Pt-40/NbO-NB.

Catalyst Property Analysis

High-resolution transmission electron microscopy (HR-TEM) and high-resolution scanning electron microscope (HR-SEM) images were obtained using a JEOL FE-2010 at 300 kV.

X-ray diffraction (XRD) was performed using an X-ray diffractometer (Rigaku Smartlab diffractometer), where Cu Kα rays generated at 40 kV and 30 mA, and a scan rate was 4°/min.

The UV-Vis diffuse reflectance spectrum of the sample was recorded using a UV-VIS-NIR spectrophotometer (CARY 5000, Agilent Technologies). Nitrogen adsorption-desorption isotherms were measured at −196° C. using an accelerated surface area and porosity analyzer, and then the samples were measured by degassing at 150° C. and 20 mTorr for 12 hours. A specific surface area was determined based on a Brunauer-Emmett-Teller (BET) method from nitrogen adsorption data in a relative pressure range between 0.05 and 0.2.

The platinum loading amount was analyzed by inductively coupled plasma optical emission spectroscopy (ICP- OES) using an iCAP7400 (Thermo Scientific). For ICP-OES measurement, 5 mg of each sample was added to 10 mL of aqua regia. After 24 hours, a solution in which Pt was dissolved was separated from an insoluble niobium oxide powder, diluted 10-fold with distilled water before ICP analysis, and then measured.

Electrochemical Analysis

Electrochemical measurements by an electrode system were performed at room temperature using a rotating disk electrode (RDE) connected to an electrochemical analyzer (Biologic VMP3) using Ag/AgCl containing saturated KCl and Pt wires as reference and counter electrodes, respectively. All potentials were measured with a reversible hydrogen electrode (RHE). For this, the Ag/AgCl reference electrode was calibrated based on the RHE above.

A glassy carbon RDE coated with the catalysts prepared from each Examples and a commercially available Pt supported on carbon catalyst (Tanaka, 46.2 wt % Pt supported on ketjen black) was used as the working electrode. A dispersion prepared by mixing 5.0 mg of a catalyst in a mixture of 0.1 ml of a 5% Nafion (Sigma Aldrich) solution and 0.9 ml of distilled water was prepared as a catalyst ink. The dispersed ink was cast onto a glassy carbon electrode and dried in an oven at 60° C.

Cyclic voltammetry (CV) experiments to measure ORR activity were performed in an oxygen-saturated 0.1 M $HClO_4$ solution at a scan rate of 50 mV/s at a potential range of +1.2 to −0.2 V in an acidic medium. Linear sweep voltammetry (LSV) curves for ORR were recorded in the range of +1.0 to −0.2 V in an acidic medium at a potential scan rate of 10 mV/s, where a Pt ring potential was measured at a set potential of +1.2 V.

Membrane Electrode Assemblies (MEAs) and Single Cell Testing and Durability Evaluation Membrane electrode assemblies (MEAs) were prepared using a catalyst-coated membrane (CCM) with an active area of 10 $cm^2$. Commercially available Pt/C (Tanaka, 46.2 wt % Pt on ketjen black) was used as an anode catalyst for all tests. Pt-X/NbO-PD, Pt-40/NbO-NB, and Pt/C (Tanaka) catalysts synthesized in Examples and Comparative Examples were used as active reduction electrodes. All catalyst inks were composed of catalyst powder, 2-propanol, deionized water, and 5 wt % Nafion solution (Sigma Aldrich). The well-dispersed catalyst slurry was directly sprayed onto a Nafion N211 membrane and the prepared CCM was dried at 60° C. to finally manufacture a membrane-electrode assembly.

PEMFC performance was tested at 80° C. and fully humidified hydrogen and oxygen were supplied to the cathode and anode at flow rates of 300 and 1,000 mL/min, respectively. During the test, a back pressure was maintained at 0.5 bar.

Polarization curves of the MEA were performed under constant current using a PEMFC test station (Scitech Inc., Korea). Electrochemical impedance spectroscopies (EISs) were measured in a range of 5 kHz to 100 mHz at a cell current of 200 $mA/cm^2$. During the test, a back pressure was maintained at 0.5 bar. Using a potentiostat (Bio-Logic, SP-150) coupled with a booster (VMP3B-20), CV was obtained in a range of 0.1 V to 1.2 V at a scan rate of 50 mV/s to measure an electrochemically active surface area of a cathode catalyst. Here, hydrogen (100 sccm) and nitrogen (50 sccm) completely humidified under conditions of 80° C. and normal pressure were supplied to the anode and cathode, respectively.

To test the durability of the catalyst, an accelerated durability test (ADT) was performed based on a catalyst support cycle and an electrochemical catalyst cycle according to the US Department of Energy (DOE). For the catalyst support cycle, triangle voltage cycling tests were performed at a scan rate of 500 mV/s in a range of 1.0 to 1.5V. After 5000 cycles, polarization curves, CV and EIS were obtained.

For the electrochemical catalyst cycle, a square voltage cycling test was performed in a range of 0.6 to 0.95 V with a hold time of 3 seconds at both potentials. After 10 k, 20 k, and 30 k cycles, polarization curves, CV and EIS were obtained.

<Shape Analysis of Composite Particles of Core-Shell Structure>

Figure 2:
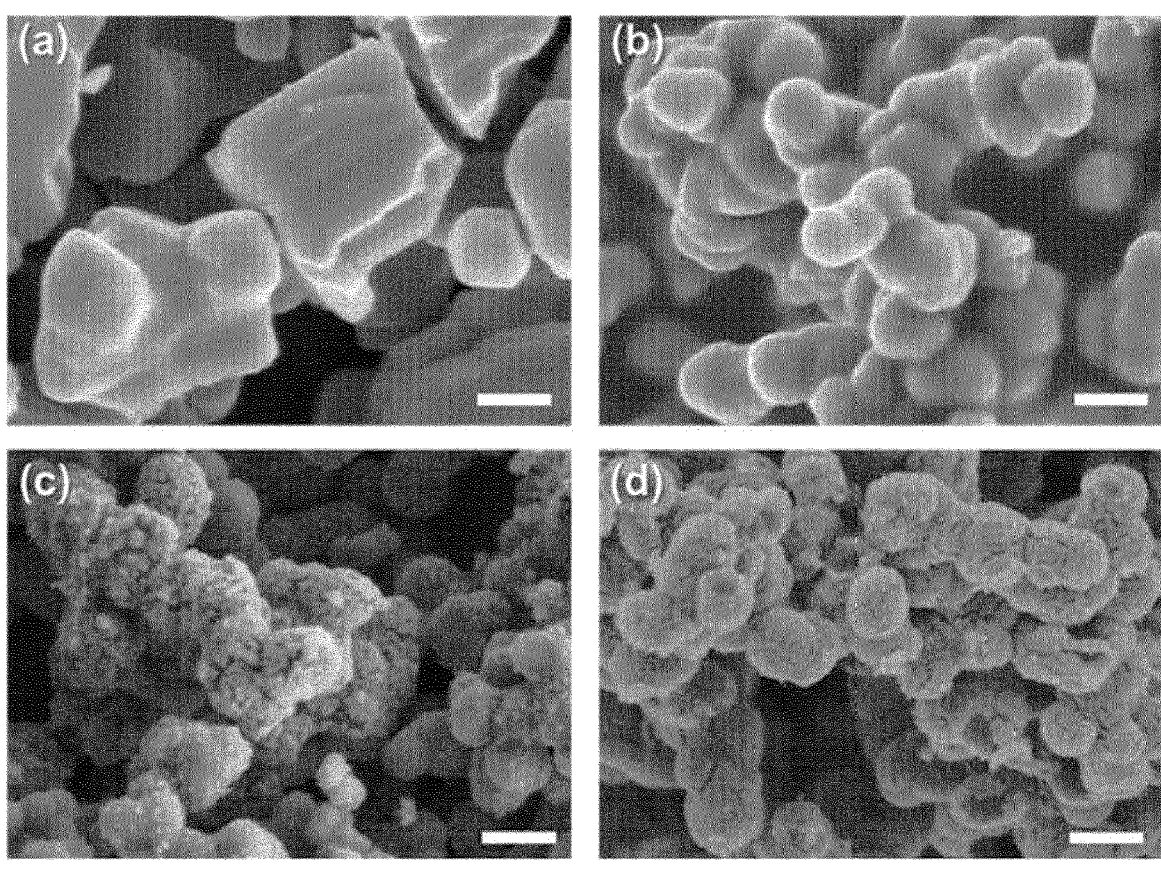
FIG. 2 illustrates scanning electron microscope (SEM) images of a commercially available bulk niobium oxide particles, recrystallized niobium oxide particles, platinum-deposited Pt-40/NbO-NB composite particles, and Pt-40/NbO-PD composite particles, respectively.

(a) and (b) of FIG. 2 illustrate SEM images of bulk and recrystallized niobium oxide samples. After recrystallization, the size of particles decreased to about 100 nm in bulk samples with an average particle diameter of 500 to 1,000 nm, as shown in the SEM images.

As a result of observing the composite particles of a core-shell structure according to Example 1 and Comparative Example 1, in the case of Pt-40/NbO-NB prepared by a chemical reduction method, (c) of FIG. 2 illustrates that Pt nanoparticles of different sizes are deposited on the surface of the niobium oxide nanoparticles in a heterogeneous distribution, and even the Pt nanoparticles are not deposited, and the surface of the niobium oxide nanoparticles has exposed surfaces. Meanwhile, (d) of FIG. 2 illustrates that Pt-40/NbO-PD shows a uniform distribution of small Pt nanoparticles, and the surface of the niobium oxide nanoparticles is not exposed and is coated with Pt nanoparticles as a whole to form a thin and uniform Pt shell. Here, the scale bars in FIG. 2 mean 100 nm.

Figure 3:
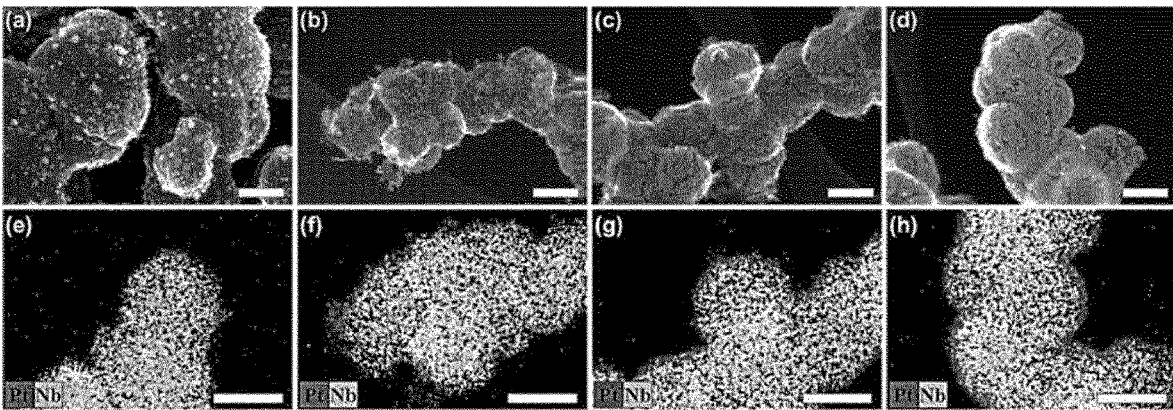
FIG. 3 illustrates high-resolution scanning electron microscope (HR-SEM) images and elemental mapping results by energy dispersive spectroscopy (EDS) for Pt-X/NbO-PD depending on a Pt loading amount.

FIG. 3 illustrates HR-SEM images and EDS mapping results for Pt-X/NbO-PD with different amounts of Pt. (a) and (f) of FIG. 3 illustrate an HR-SEM image and an EDS mapping result of Pt-10/NbO-PD, (b) and (f) of FIG. 3 illustrate an HR-SEM image and an EDS mapping result of Pt-20/NbO-PD, FIGS. 3C and 3G illustrate an HR-SEM image and an EDS mapping result of Pt-30/NbO-PD, and FIGS. 3D and 3H illustrate an HR-SEM image and an EDS mapping result of Pt-40/NbO-PD. The scale bars of all images are mean 100 nm.

When loaded with a low Pt content of 10 wt % in (a) of FIG. 3, the separated and individually formed Pt nanoparticles were distributed on the surface of the niobium oxide particles, whereas as the Pt content increased, the Pt nanoparticles were more densely packed on the surface of the niobium oxide particles, as illustrated in (d) of FIG. 3. Similarly, in the EDS mapping results of (e) and (h) of FIG. 3, as the amount of Pt loading on the surface of the niobium oxide particles increases, the Pt nanoparticles are densely formed on the surface of the niobium oxide particle to form a uniform shell. As a result of EDS analysis, it was found that the platinum shell had a thickness of 10 to 20 nm.

Figure 4:
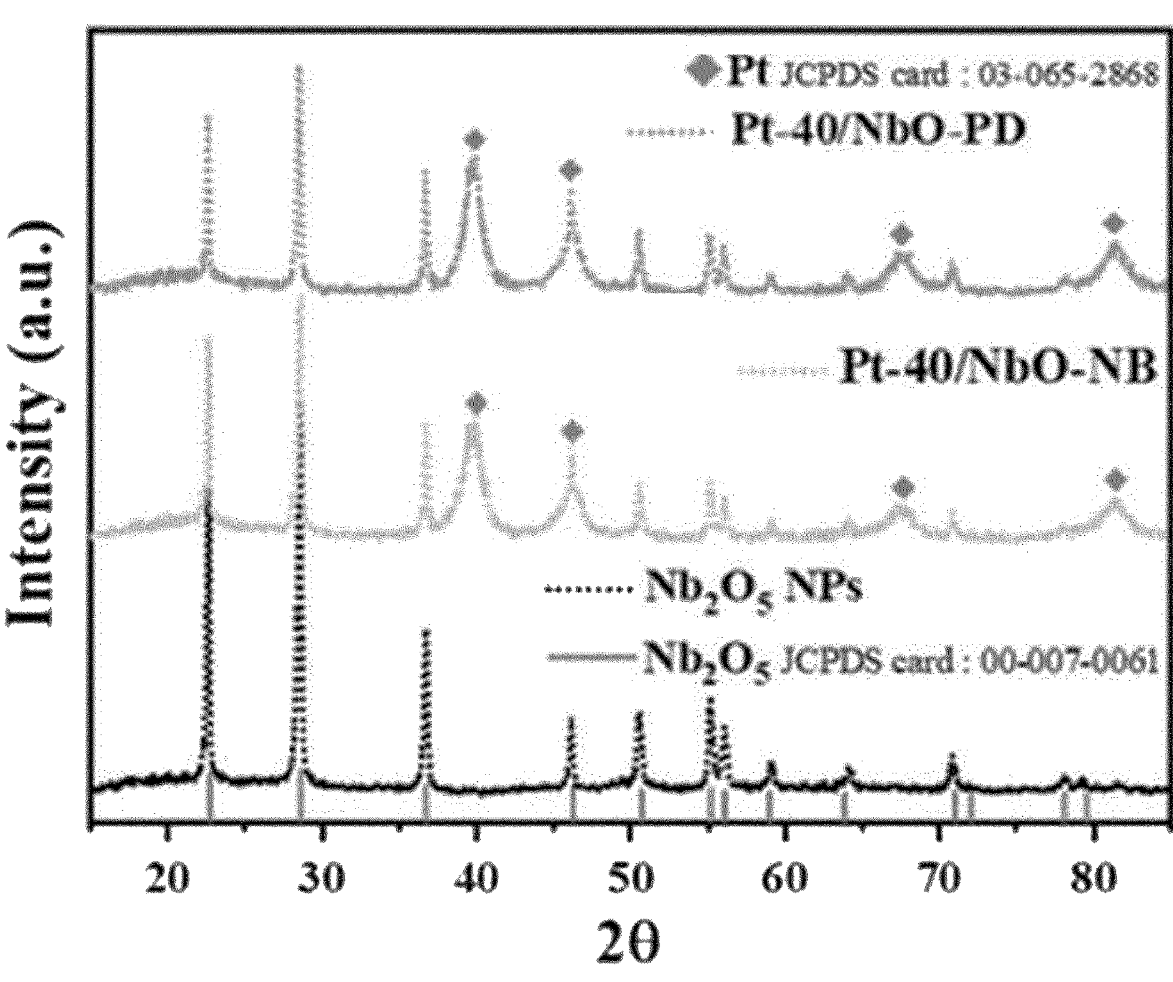
FIG. 4 illustrates a result of X-ray diffraction (XRD) analysis of niobium oxide particles and platinum-deposited composite particles (Pt-40/NbO-NB and Pt-40/NbO-PD) of a core-shell structure.

FIG. 4 illustrates the results of XRD analysis that platinum is deposited on Pt-40/NbO-PD and Pt-40/NbO-NB, respectively, to form a shell. Specifically, crystal peaks of niobium oxide are simultaneously observed in $Nb_2O_5$, Pt-40/NbO-PD and Pt-40/NbO-NB, and a crystal peak of platinum was observed in a platinum-deposited sample, and it can be confirmed that the platinum precursor was reduced and deposited on the surface of the niobium oxide particles.

<Electrochemical ORR Catalytic Activity Analysis>

Figure 5:
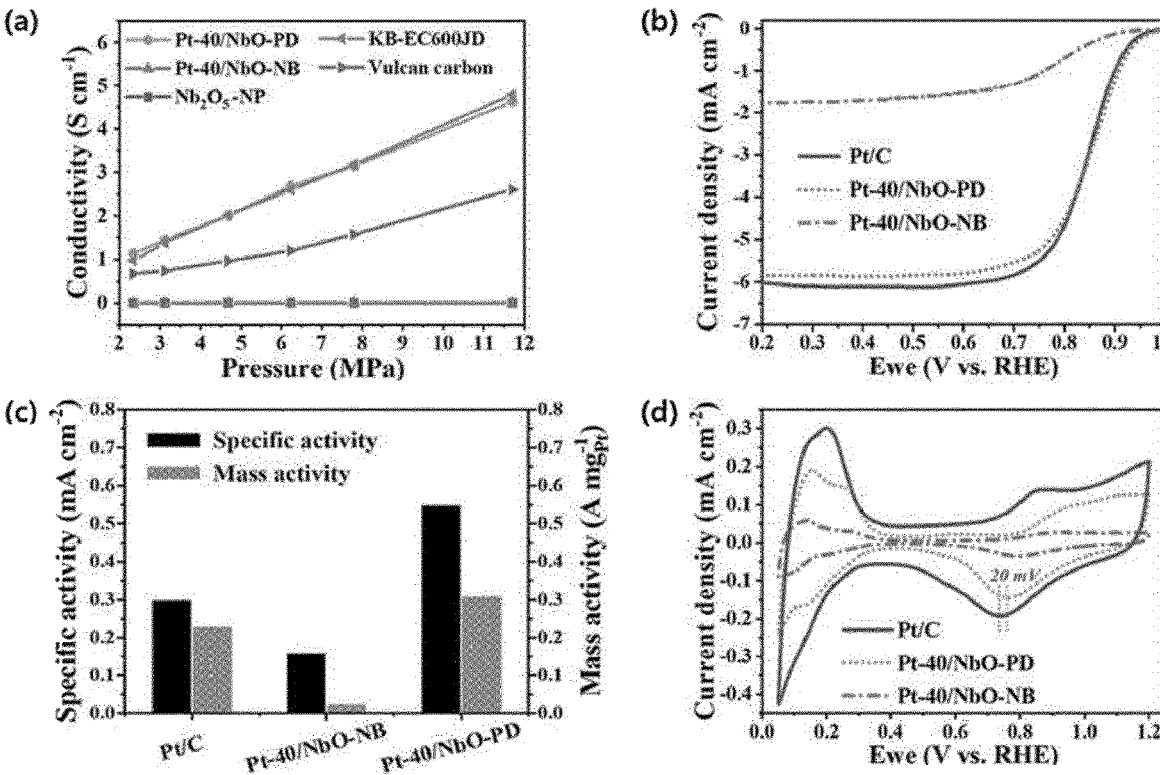
FIG. 5 illustrates results of electrochemical measurements by electrode systems, and illustrates graphs illustrating a comparison of electrical conductivity of Pt-40/NbO-PD and Pt-40/NbO-NB and the commercially available carbons, and a comparison of electrochemical ORR activities of the platinum-deposited composite particles with a commercially available Pt/C catalyst.

FIG. 5 illustrates results of electrochemical measurement by an electrode system, and illustrates graphs illustrating a comparison of electrical conductivity of Pt-40/NbO-PD and Pt-40/NbO-NB and the commercially available carbons (Vulcan carbon, KB-EC600JD) (see (a) of FIG. 5), and a comparison of activities of a commercially available 46% Pt/C (Tanaka) and electrochemical ORR catalysts (see (b) to (d) of FIG. 5). (a) of FIG. 5 illustrates the electrical conductivity vs. pressure profile of each sample, (b) of FIG. 5 illustrates the ORR polarization curve obtained in 0.1 M $HClO_4$ saturated with oxygen, (c) of FIG. 5 illustrates the specific activity and mass activity of the catalyst measured at 0.9V, and (d) of FIG. 5 illustrates the CV in a 0.1 M $HClO_4$ solution saturated with nitrogen.

(a) of FIG. 5 illustrates that niobium oxide exhibited little conductivity due to its semiconductor properties of wide bandgap, whereas Pt-40/NbO-PD exhibited high electrical conductivity. The rapid increase in the conductivity of Pt-40/NbO-PD suggests that an excellent electrical conduction pathway was formed by the thin metallic Pt shell. In particular, Pt-40/NbO-PD was found to have higher or similar electrical conductivity compared to commercially available carbon. On the other hand, Pt-40/NbO-NB exhibited very low electrical conductivity similar to that of niobium oxide, and this characteristic was due to the fact that the surface of niobium oxide was not completely coated with the Pt shell and was exposed.

LSV of (b) of FIG. 5 illustrated that Pt-40/NbO-PD had open circuit voltage (OCV) and ORR catalytic activity equivalent to that of commercially available Pt/C, and also diffusion limited current density equivalent to that of commercially available Pt/C. Meanwhile, Pt-40/NbO-NB showed a very low diffusion limited current density of 1.75 $mA/cm^2$.

Table 1 below shows the content of platinum loaded on the niobium oxide nanoparticles measured by ICP-OES.

TABLE 1

| Sample name | Pt loading amount (wt %) |
|---|---|
| Pt-40/NbO-PD | 36.68 |
| Pt-30/NbO-PD | 26.66 |
| Pt-20/NbO-PD | 19.48 |
| Pt-10/NbO-PD | 9.84 |
| Pt-40/NbO-NB | 38.02 |

(c) of FIG. 5 illustrates that Pt-40/NbO-PD showed the best catalytic activity in terms of specific activity and mass activity of the catalyst. In order to evaluate the mass activity, the actual content of platinum was used as the result of ICP-OES analysis in Table 1 above. Actual platinum content was similar to commercially available Pt/C, Pt-40/NbO-NB, and Pt-40/NbO-PD, but Pt-40/NbO-PD showed the best activity compared to commercially available Pt/C, which was attributed to the electrical conductivity of the Pt shell coated on the surface of the niobium oxide compared to Pt-40/NbO-NB in the interaction between excellent platinum-niobium oxides.

Referring to (d) of FIG. 5, since niobium oxide and bulk Pt had a low surface area, compared to commercially available Pt/C, the composite particles of a core-shell structure (Pt-40/NbO) also had a lower double layer capacitance area on lower hydrogen adsorption-desorption and CV profiles. However, Pt-40/NbO-PD had a weaker adsorption property for active species such as OH— by being transferred to a higher oxygen adsorption potential, and at the same time may have more excellent ORR catalytic activity. This significant catalytic activity is due to the fact that a film-like platinum shell is formed on the niobium oxide particles, and also to the fact that the niobium oxide particles and the platinum shell are bonded through a strong interaction to improve the catalytic activity. Meanwhile, Pt-40/NbO-NB showed low hydrogen adsorption-desorption, low double layer capacitance area on CV profile, and low ORR catalytic activity due to the nonconductivity of the exposed niobium oxide surface.

Figure 6:
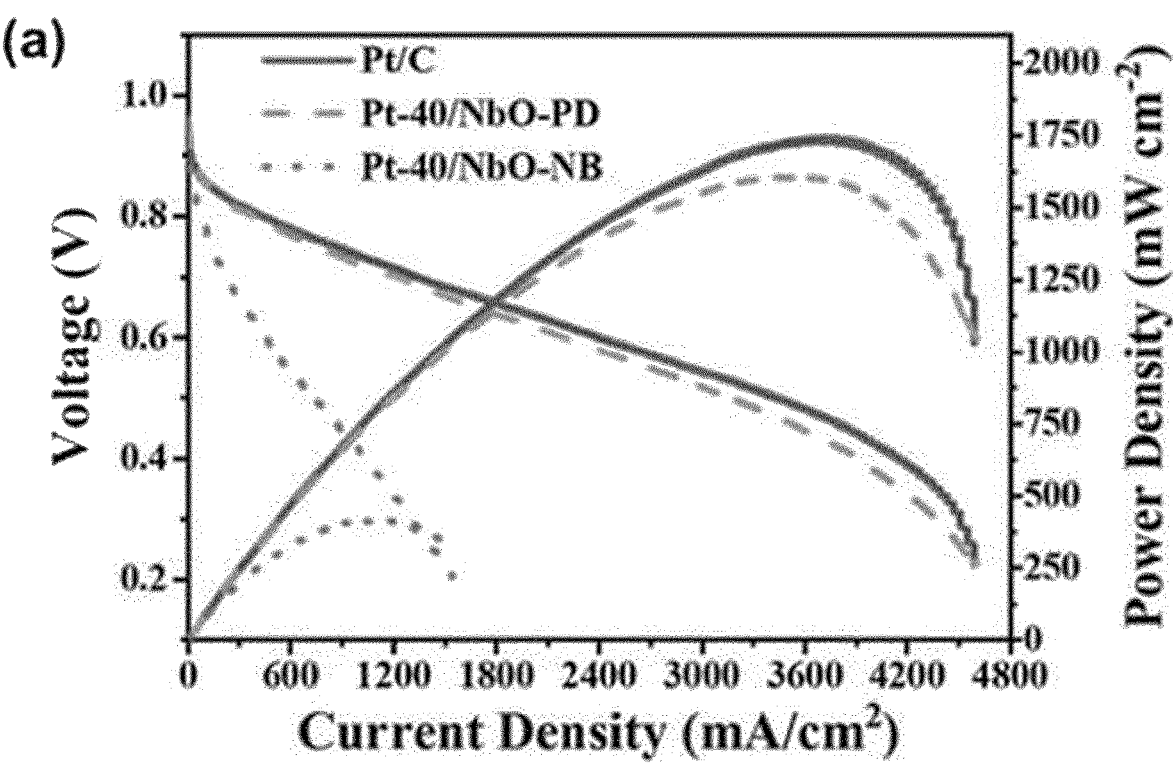
FIG. 6 illustrates polarization curves and power density curves for a polymer electrolyte fuel cell (PEMFC) manufactured using Pt-40/NbO-PD, Pt-40/NbO-NB, commercially available Pt/C, and Pt-X/NbO-PD depending on a platinum loading amount, respectively.
Figure 6:
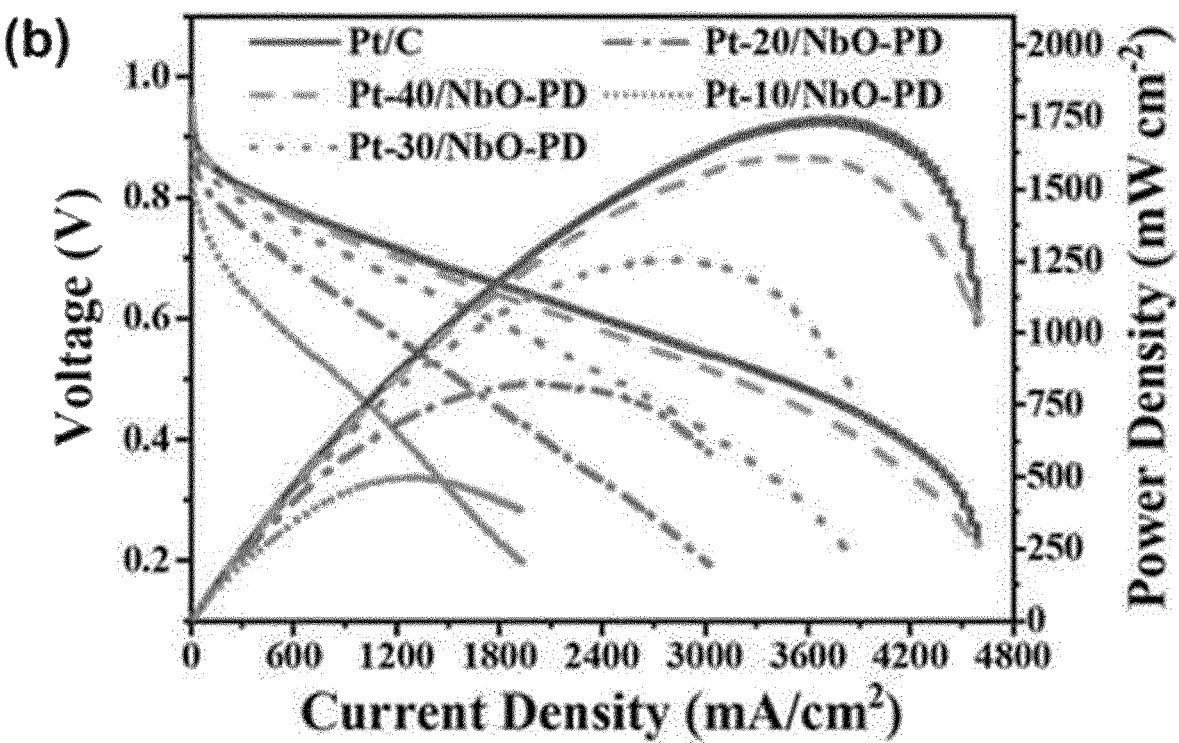

(a) of FIG. 6 illustrates polarization curves and power density curves for PEMFCs made of Pt-40/NbO-PD, commercially available Pt/C, and Pt-40/NbO-NB. Similar to (b) and (d) of FIG. 5, Pt-40/NbO-PD showed similar activity to commercially available Pt/C in terms of electrical conductivity and ORR catalytic activity due to the Pt shell uniformly formed on the catalyst surface. Meanwhile, Pt-40/NbO-NB had a platinum loading amount similar to that of Pt-40/NbO-PD, but showed very low power density due to electrical resistance caused by the exposed non-conductive surface.

(b) of FIG. 6 illustrates polarization curves and power density curves for PEMFCs made of Pt-X/NbO-PD according to the platinum loading amount. As the platinum loading amount increased, a uniform Pt shell was formed on the surface of niobium oxide, resulting in improved polarization curve and power density.

Figure 7:
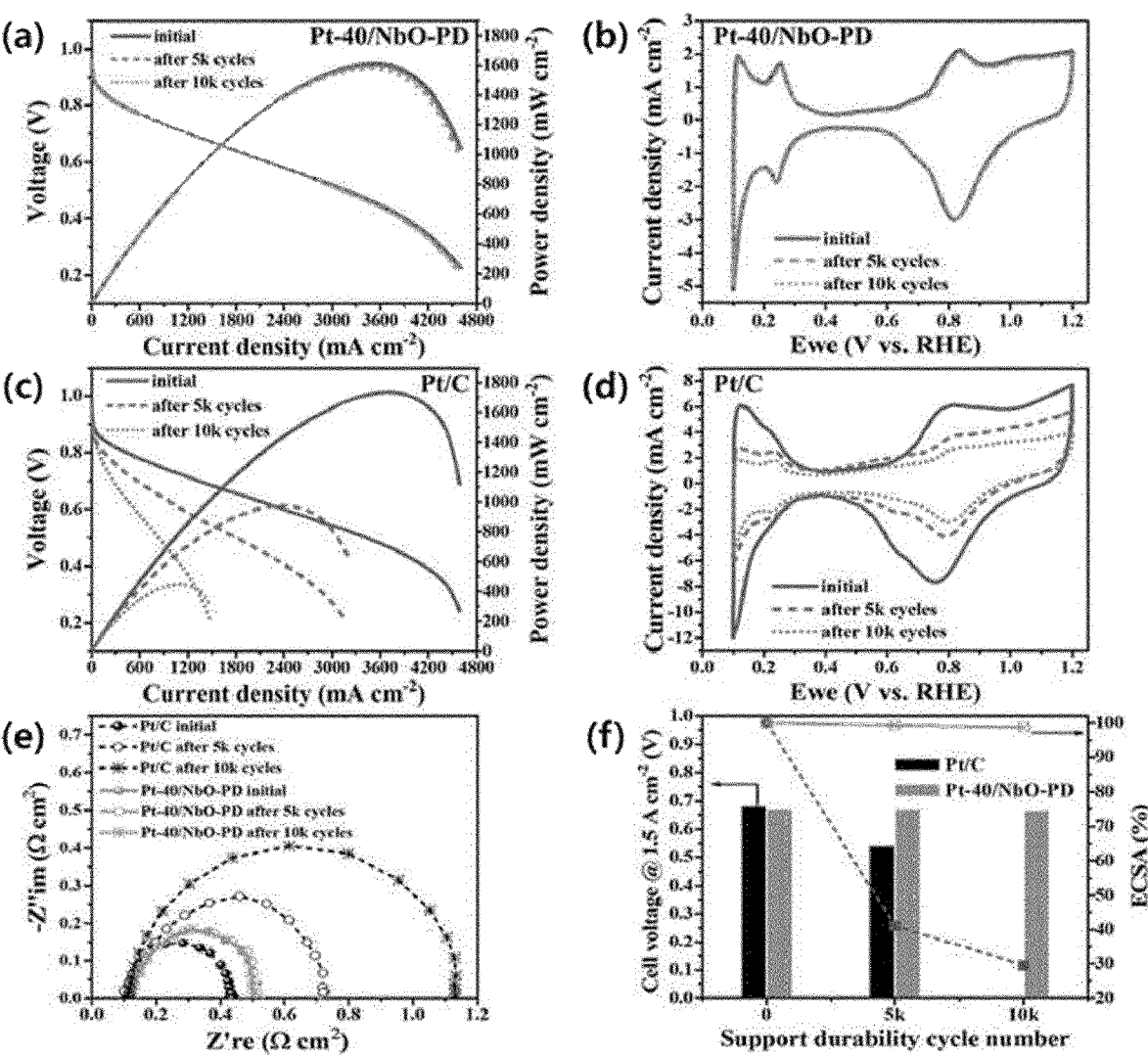
FIG. 7 illustrates polarization curves, power density curves, cyclic voltammetry curves, electrochemical impedance spectroscopy (EIS) results, and an electrochemically active surface area (ECSA (%)) according to the progress of a catalyst support stability evaluation, respectively.

(a) and (c) of FIG. 7 illustrate polarization curves and power density curves for PEMFCs manufactured using Pt-40/NbO-PD and commercially available Pt/C, respectively, measured before and after an accelerated durability test (ADT) for the catalyst support. It could be confirmed from (a) of FIG. 7 that Pt-40/NbO-PD showed almost the same polarization curve as the initial value even after 10,000 cycles of an accelerated durability test (ADT) on the catalyst support, and accordingly, the power density also showed a similar value to the initial value, and thus had excellent durability. Meanwhile, it can be confirmed that in the case of commercially available Pt/C, after 10,000 cycles of an accelerated durability test on the catalyst support, although an open circuit voltage (OCV) was similar to that of the initial value, the activation loss rapidly increased as the current density increased, resulting in a significant increase in the slope of the polarization curve. Accordingly, a maximum power density was reduced by 74% or more compared to the initial value, and durability was significantly reduced.

(b) and (d) of FIG. 7 illustrate cyclic voltammetry curves for Pt-40/NbO-PD and commercially available Pt/C, respectively, measured before and after an accelerated durability test (ADT) for the catalyst support. (b) of FIG. 7 illustrates that Pt-40/NbO-PD exhibited almost similar electrochemical properties to those of the initial value even after 10,000 cycles of an accelerated durability test (ADT) on the catalyst support. Specifically, it can be confirmed that there was almost no change in adsorption/desorption peaks of hydrogen in a range of 0.1 to 0.35 V and oxygen in a range of 0.7 to 1.2 V, and excellent electrical activity and reversibility were exhibited.

Meanwhile, it can be confirmed that the commercially available Pt/C showed a significant decrease in adsorption/desorption peaks of hydrogen and oxygen after 10,000 cycles of an accelerated durability test on a catalyst support, and a shift in the position of adsorption/desorption peaks of the oxygen. These results indicate that the electrochemical activity was reduced due to detachment and aggregation of the platinum particles loaded on the support while the carbon support was oxidized and lost.

(e) of FIG. 7 illustrates the results of electrochemical impedance spectroscopy (EIS) for Pt-40/NbO-PD and commercially available Pt/C. It can be confirmed from (e) of FIG. 7 that after 10,000 cycles of an accelerated endurance test on the catalyst support, the charge transfer resistance of 40/NbO-PD was almost maintained, while the commercially available Pt/C increased by 2 times or more.

(f) of FIG. 7 is a diagram illustrating a change in ECSA calculated based on the CV and polarization curve and a change in voltage at 1.5 A/cm² according to the cycle number of accelerated durability test for the catalyst support. It can be seen from (f) of FIG. 7 that the initial ECSA values of Pt-40/NbO-PD and commercially available Pt/C showed that after 10,000 cycles of an accelerated durability test, Pt-40/NbO-PD had a decrease of about 1% in ECSA value, whereas commercially available Pt/C has almost reduced by 70%. The voltage at 1.5 A/cm² was almost maintained at 0.66 V, a decrease of 10 mV from 0.67 V for Pt-40/NbO-PD, whereas commercially available Pt/C could not obtain the corresponding value in the polarization curve due to a rapid decrease in activity.

Figure 8:
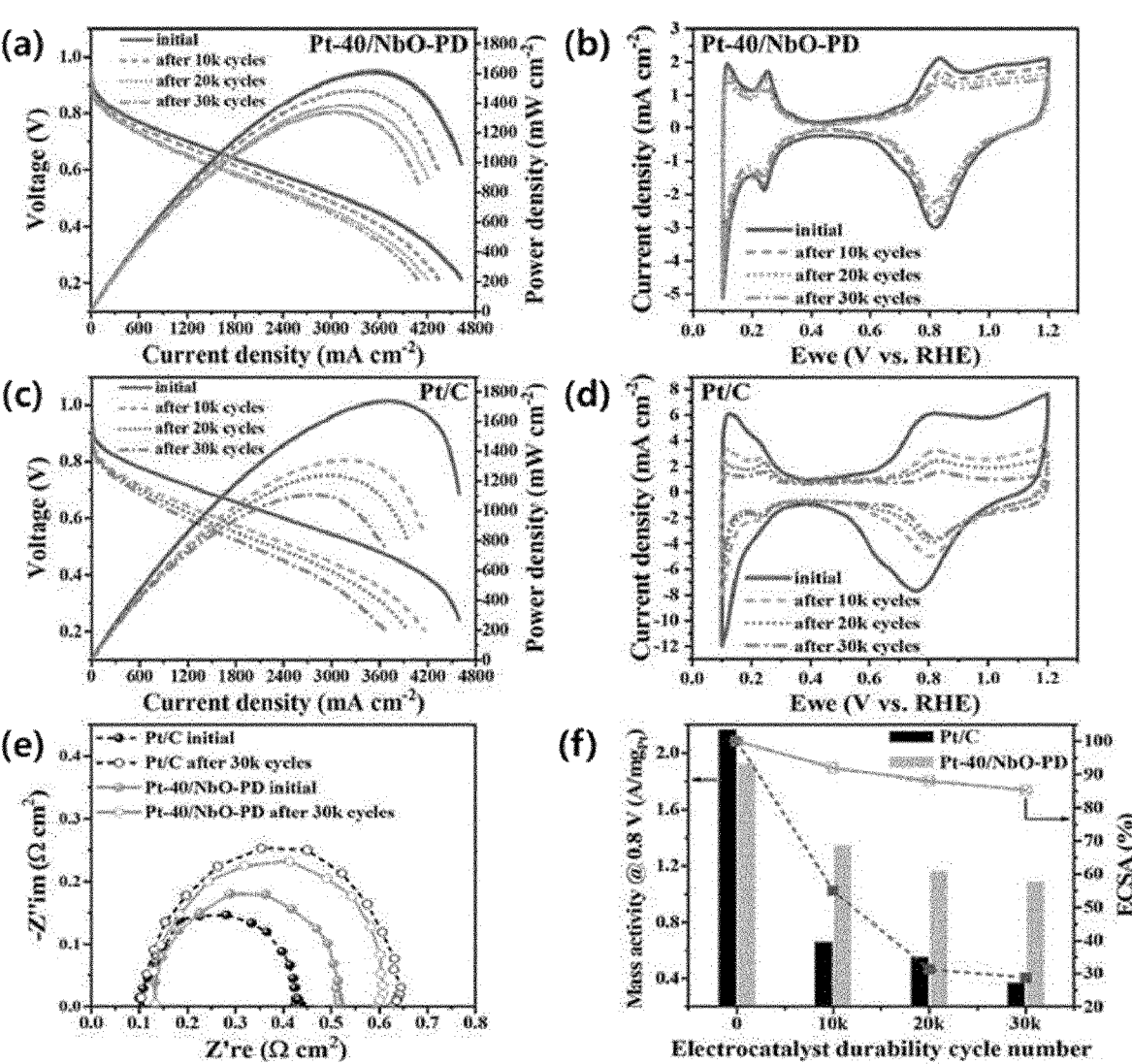
FIG. 8 illustrates polarization curves, power density curves, cyclic voltammetry curves, electrochemical impedance spectroscopy (EIS) results, and an electrochemically active surface area (ECSA (%)) according to the progress of an electrocatalyst stability evaluation, respectively.

(a) and (c) of FIG. 8 illustrate polarization curves and a power density curves for PEMFCs manufactured using Pt-40/NbO-PD and commercially available Pt/C, respectively, measured before and after an accelerated durability test (ADT) for electrochemical catalysts. It could be confirmed from (a) of FIG. 8 that after 30,000 cycles of an accelerated durability test (ADT) for electrocatalysts, Pt-40/NbO-PD had excellent durability with only a 16.8% reduction in power density compared to the initial value. Meanwhile, it can be confirmed that in the case of commercially available Pt/C, after the 30,000 cycle accelerated durability test, an open circuit voltage (OCV) decreased, and activation loss rapidly increased as the current density increased, resulting in a significant increase in the slope of the polarization curve. Accordingly, a maximum power density was reduced by 36% or more compared to the initial one, and durability was significantly reduced.

(b) and (d) of FIG. 8 illustrate cyclic voltammetry curves for Pt-40/NbO-PD and commercially available Pt/C, respectively, measured before and after an accelerated durability test (ADT) for the electrochemical catalysts. It can be confirmed that after 30,000 cycles of an accelerated durability test (ADT) on an electrochemical catalyst, Pt-40/NbO-PD showed excellent electrochemical activity and reversibility, with a well-maintained area of adsorption/desorption peaks of hydrogen in a range of 0.1 to 0.35 V and oxygen in the range of 0.7 to 1.2 V.

Meanwhile, it was determined that after 30,000 cycles of an accelerated durability test for electrocatalysts, commercially available Pt/C had significantly reduced adsorption/desorption peaks of hydrogen and oxygen, and as a result, electrochemical activity decreased due to dissolution, recrystallization, and aggregation of platinum particles by repetitive oxidation and reduction currents.

(e) of FIG. 8 illustrates the results of electrochemical impedance spectroscopy (EIS) for Pt-40/NbO-PD and commercially available Pt/C. (e) of FIG. 8 illustrates that the ohmic resistance and charge transfer resistance of Pt-40/NbO-PD were initially greater than those of commercially available Pt/C. This is determined to be due to the resistance generated in niobium oxide, which is the core. Meanwhile, it can be confirmed that after the 30,000 cycle accelerated durability test, the charge transfer resistance of Pt-40/NbO-PD increased by 15.8%, whereas the commercially available Pt/C increased by 60.6%.

(f) of FIG. 8 is a diagram illustrating a change in ECSA calculated based on the CV and polarization curve and a change in activity per mass of platinum at 0.8 V according to the number of accelerated durability test cycles for the electrochemical catalysts. It can be confirmed from (f) of FIG. 8 that after 30,000 cycles of an electrocatalyst accelerated durability test, the ECSA value decreased by 14.7% for Pt-40/NbO-PD and 71.4% for commercially available Pt/C.

Hereinabove, although the present invention has been described by specific matters, the limited embodiments, and drawings, they have been provided only for assisting in a more general understanding of the present invention. Therefore, the present invention is not limited to the exemplary embodiments. Various modifications and changes may be made by those skilled in the art to which the present invention pertains from this description.

Therefore, the spirit of the present invention should not be limited to the above-mentioned embodiments, but the claims and all of the modifications equal or equivalent to the claims are intended to fall within the scope and spirit of the present invention.

The invention claimed is:

1. Composite particles of a core-shell structure, comprising:
   a core containing a metal oxide; and
   a shell containing a platinum-group transition metal surrounding the metal oxide,
   wherein the metal oxide has a maximum absorption wavelength at 250 to 550 nm, and
   wherein the shell has a thickness of 3 to 50 nm.

2. The composite particles of a core-shell structure of claim 1, wherein the metal oxide is niobium oxide.

3. The composite particles of a core-shell structure of claim 1, wherein the platinum-group transition metal is platinum (Pt).

4. The composite particles of a core-shell structure of claim 1, wherein primary particles of the metal oxide have a diameter of 3 to 1,000 nm.

5. The composite particles of a core-shell structure of claim 1, wherein the platinum-group transition metal of the shell is prepared from a photoreduction reaction of a platinum-group transition metal precursor.

6. The composite particles of a core-shell structure of claim 1, wherein the metal oxide is a catalyst support for platinum-group transition metal-based electrochemical reactions including an oxygen reduction reaction.

7. A catalyst for platinum-group transition metal-based electrochemical reactions including an oxygen reduction reaction, containing the composite particles of a core-shell structure of claim 1.

8. The catalyst of claim 7, wherein the catalyst for platinum-group transition metal-based electrochemical reactions including an oxygen reduction reaction includes a plurality of composite particles of a core-shell structure, wherein the plurality of composite particles aggregate with each other to form an aggregate and to make an electrically-conductive contact to each other.

9. The catalyst of claim 7, wherein the catalyst for platinum-group transition metal-based electrochemical reactions including the oxygen reduction reaction includes 5% by weight or less of carbon.

10. An electrode comprising the composite particles of a core-shell structure of claim 1.

11. A platinum-group transition metal-based electrochemical conversion device, comprising the composite particles of a core-shell structure of claim 1.

12. A fuel cell comprising:
   an anode;
   an electrolyte membrane; and
   a cathode including the composite particles having a core-shell structure of claim 1 applied to one side of the electrolyte membrane.

13. A fuel cell of claim 12, wherein the cathode includes 5% by weight or less of carbon.

14. A method for preparing the composite particles of a core-shell structure, comprising:
   (a) preparing a dispersion by dispersing metal oxide particles having a maximum absorption wavelength at 250 to 550 nm in an alcohol solution;
   (b) preparing a mixed solution by mixing an aqueous solution of a platinum-group transition metal precursor with the dispersion; and
   (c) preparing composite particles of a core-shell structure comprising a shell having a thickness of 3 to 50 nm by irradiating the mixed solution with light.

15. The method of claim 14, wherein the platinum-group transition metal precursor is a water-soluble platinum-group transition metal precursor.

16. The method of claim 14, wherein the metal oxide particles have a band gap of 2.0 eV or more.

17. The method of claim 14, wherein the metal oxide particles in step (a) are prepared from:
   preparing a metal oxide solution dissolved in hydrofluoric acid;
   preparing a diluted solution by mixing the metal oxide solution with water;
   preparing a precipitate by mixing the diluted solution with a reducing agent to adjust a pH to basic; and
   performing heat treatment on the precipitate.

* * * * *